United States Patent
Evans et al.

(10) Patent No.: US 8,977,770 B2
(45) Date of Patent: *Mar. 10, 2015

(54) SKIP FEATURE FOR A BROADCAST OR MULTICAST MEDIA STATION

(71) Applicant: LEMI Technology, LLC, Wilmington, DE (US)

(72) Inventors: Gregory M. Evans, Raleigh, NC (US); Eugene Matthew Farrelly, Cary, NC (US)

(73) Assignee: Lemi Technolgy, LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/914,186

(22) Filed: Jun. 10, 2013

(65) Prior Publication Data

US 2013/0275614 A1    Oct. 17, 2013

Related U.S. Application Data

(63) Continuation of application No. 12/768,980, filed on Apr. 28, 2010, now Pat. No. 8,463,930.

(51) Int. Cl.
| | |
|---|---|
| *G06F 15/16* | (2006.01) |
| *H04H 20/10* | (2008.01) |
| *H04H 20/28* | (2008.01) |
| *H04H 20/40* | (2008.01) |
| *H04H 40/18* | (2008.01) |

(Continued)

(52) U.S. Cl.
CPC ............. *H04L 65/60* (2013.01); *H04H 20/106* (2013.01); *H04H 20/28* (2013.01); *H04H 20/40* (2013.01); *H04H 40/18* (2013.01); *H04H 60/27* (2013.01)
USPC ............................ 709/231; 709/250; 709/230

(58) Field of Classification Search
None
See application file for complete search history.

(56) References Cited

U.S. PATENT DOCUMENTS

| 5,455,570 A | 10/1995 | Cook et al. |
| 5,682,550 A | 10/1997 | Brown et al. |

(Continued)

FOREIGN PATENT DOCUMENTS

| GB | 2306869 | 5/1997 |
| GB | 2397205 | 7/2004 |
| WO | WO 97/26601 | 7/1997 |

OTHER PUBLICATIONS

Lingnau et al., "An HTTP-based Infrastructure for Mobile Agents," at <http://www.w3.org/Conferences/WWW4/Papers/150/>, 1995, pp. 1-15, printed Dec. 20, 1999, 15 pages.

(Continued)

*Primary Examiner* — John B. Walsh

(57) ABSTRACT

A skip function for a broadcast or multicast media station is disclosed. In one embodiment, two content streams are simultaneously transmitted for a single radio station. A receiving device simultaneously receives the two content streams transmitted for the radio station. The receiving device provides playback of a first content stream of the two content streams. During playback of the first content stream, the receiving device buffers one or more most recently received content items from the second content stream. When a user of the receiving device initiates a skip, the receiving device performs a skip function by switching playback from the first content stream to the second content stream beginning at the start of the one or more most recently received content items from the second content stream that have been buffered at the receiving device.

40 Claims, 11 Drawing Sheets

Figure 1:
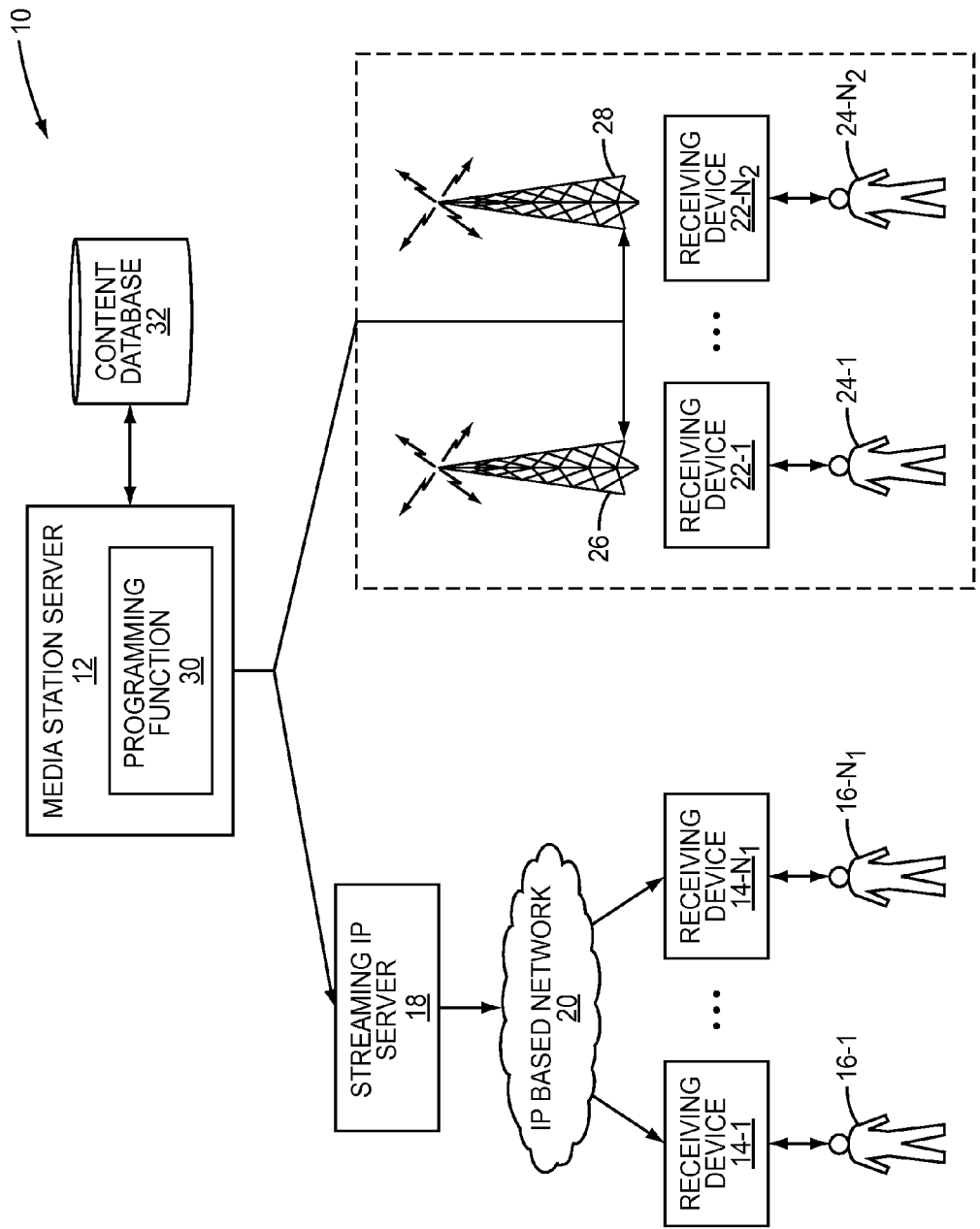

(51) Int. Cl.
*H04H 60/27* (2008.01)
*H04L 29/06* (2006.01)

(56) References Cited

U.S. PATENT DOCUMENTS

| | | | |
|---|---|---|---|
| 5,721,827 A | 2/1998 | Logan et al. | |
| 5,758,257 A | 5/1998 | Herz et al. | |
| 5,790,935 A | 8/1998 | Payton | |
| 5,815,662 A | 9/1998 | Ong | |
| 5,818,510 A | 10/1998 | Cobbley et al. | |
| 5,819,273 A | 10/1998 | Vora et al. | |
| 5,855,015 A | 12/1998 | Shoham | |
| 5,864,682 A | 1/1999 | Porter et al. | |
| 5,873,045 A | 2/1999 | Lee et al. | |
| 5,920,856 A | 7/1999 | Syeda-Mahmood | |
| 5,926,624 A | 7/1999 | Katz et al. | |
| 5,956,716 A | 9/1999 | Kenner et al. | |
| 5,974,441 A | 10/1999 | Rogers et al. | |
| 5,983,200 A | 11/1999 | Slotznick | |
| 5,983,218 A | 11/1999 | Syeda-Mahmood | |
| 5,986,692 A | 11/1999 | Logan et al. | |
| 6,009,422 A | 12/1999 | Ciccarelli | |
| 6,018,768 A | 1/2000 | Ullman et al. | |
| 6,029,165 A | 2/2000 | Gable | |
| 6,038,591 A | 3/2000 | Wolfe et al. | |
| 6,060,997 A | 5/2000 | Taubenheim et al. | |
| 6,081,780 A | 6/2000 | Lumelsky | |
| 6,088,722 A | 7/2000 | Herz et al. | |
| 6,093,880 A | 7/2000 | Arnalds | |
| 6,108,686 A | 8/2000 | Williams, Jr. | |
| 6,122,757 A | 9/2000 | Kelley | |
| 6,125,387 A | 9/2000 | Simonoff et al. | |
| 6,128,663 A | 10/2000 | Thomas | |
| 6,161,142 A | 12/2000 | Wolfe et al. | |
| 6,167,393 A | 12/2000 | Davis, III et al. | |
| 6,246,672 B1 | 6/2001 | Lumelsky | |
| 6,248,946 B1 | 6/2001 | Dwek | |
| 6,263,507 B1 | 7/2001 | Ahmad et al. | |
| 6,289,165 B1 | 9/2001 | Abecassis | |
| 6,314,094 B1 | 11/2001 | Boys | |
| 6,317,784 B1 | 11/2001 | Mackintosh et al. | |
| 6,335,927 B1 | 1/2002 | Elliott et al. | |
| 6,339,693 B1 | 1/2002 | Chan | |
| 6,344,607 B2 | 2/2002 | Cliff | |
| 6,345,289 B1 | 2/2002 | Lotspiech et al. | |
| 6,349,339 B1 | 2/2002 | Williams | |
| 6,377,782 B1 | 4/2002 | Bishop et al. | |
| 6,411,992 B1 | 6/2002 | Srinivasan et al. | |
| 6,438,579 B1 | 8/2002 | Hosken | |
| 6,477,707 B1 | 11/2002 | King et al. | |
| 6,487,390 B1 | 11/2002 | Virine et al. | |
| 6,496,802 B1 | 12/2002 | van Zoest et al. | |
| 6,505,123 B1 | 1/2003 | Root et al. | |
| 6,560,651 B2 | 5/2003 | Katz et al. | |
| 6,581,103 B1 | 6/2003 | Dengler | |
| 6,587,127 B1 | 7/2003 | Leeke et al. | |
| 6,588,015 B1 | 7/2003 | Eyer et al. | |
| 6,600,898 B1 | 7/2003 | De Bonet et al. | |
| 6,609,096 B1 | 8/2003 | De Bonet et al. | |
| 6,615,039 B1 | 9/2003 | Eldering | |
| 6,628,928 B1 | 9/2003 | Crosby et al. | |
| 6,662,231 B1 | 12/2003 | Drosset et al. | |
| 6,684,249 B1 | 1/2004 | Frerichs et al. | |
| 6,697,824 B1 | 2/2004 | Bowman-Amuah | |
| 6,748,237 B1 | 6/2004 | Bates et al. | |
| 6,879,963 B1 | 4/2005 | Rosenberg | |
| 6,981,040 B1 | 12/2005 | Konig et al. | |
| 6,985,694 B1 | 1/2006 | De Bonet et al. | |
| 7,020,710 B2 | 3/2006 | Weber et al. | |
| 7,028,082 B1 | 4/2006 | Rosenberg et al. | |
| 7,031,931 B1 | 4/2006 | Meyers | |
| 7,043,747 B1 | 5/2006 | Cohen | |
| 7,058,694 B1 | 6/2006 | De Bonet et al. | |
| 7,079,807 B1 | 7/2006 | Daum et al. | |
| 7,102,067 B2 | 9/2006 | Gang et al. | |
| 7,133,924 B1 | 11/2006 | Rosenberg et al. | |
| 7,237,254 B1 * | 6/2007 | Omoigui | 725/94 |
| 7,337,382 B2 * | 2/2008 | Oshita et al. | 714/748 |
| 7,340,761 B2 | 3/2008 | Billmaier | |
| 7,657,337 B1 * | 2/2010 | Evans et al. | 700/94 |
| 7,711,838 B1 | 5/2010 | Boulter et al. | |
| 7,840,691 B1 | 11/2010 | De Bonet et al. | |
| 8,028,081 B2 | 9/2011 | Kandekar et al. | |
| 8,463,930 B2 * | 6/2013 | Evans et al. | 709/231 |
| 8,571,465 B2 | 10/2013 | Eastman et al. | |
| 8,806,047 B2 * | 8/2014 | Evans et al. | 709/231 |
| 2001/0025259 A1 | 9/2001 | Rouchon | |
| 2001/0051852 A1 | 12/2001 | Sundaravel et al. | |
| 2002/0010759 A1 | 1/2002 | Hitson et al. | |
| 2002/0023270 A1 | 2/2002 | Thomas et al. | |
| 2002/0116082 A1 | 8/2002 | Gudorf | |
| 2002/0138630 A1 | 9/2002 | Solomon et al. | |
| 2002/0183059 A1 | 12/2002 | Noreen et al. | |
| 2003/0103644 A1 | 6/2003 | Klayh | |
| 2003/0236843 A1 | 12/2003 | Weber et al. | |
| 2006/0072724 A1 | 4/2006 | Cohen et al. | |
| 2006/0206478 A1 | 9/2006 | Glaser et al. | |
| 2006/0212442 A1 | 9/2006 | Conrad et al. | |
| 2009/0070597 A1 | 3/2009 | Shah et al. | |
| 2009/0285155 A1 | 11/2009 | Scarpa et al. | |
| 2009/0320075 A1 | 12/2009 | Marko | |
| 2010/0095337 A1 | 4/2010 | Dua | |
| 2010/0135489 A1 | 6/2010 | Ziesler | |
| 2010/0223392 A1 | 9/2010 | Pond et al. | |
| 2010/0268361 A1 | 10/2010 | Mantel et al. | |
| 2012/0042337 A1 | 2/2012 | De Bonet et al. | |
| 2012/0066404 A1 | 3/2012 | Evans et al. | |
| 2012/0246689 A1 | 9/2012 | Thomas et al. | |
| 2012/0266076 A1 | 10/2012 | Lockhart et al. | |
| 2013/0231070 A1 | 9/2013 | Deluca et al. | |

OTHER PUBLICATIONS

Egyhazy et al., "Intelligent Web Search Agents," at <http://csgrad.cs.vt.edu/~tplunket/article.html>, pp. 1-23, printed Dec. 20, 1999, 23 pages.
"FAQ," at <http://blog.pandora.com/faq/>, ©2005-2006, Pandora Media, Inc., printed Aug. 8, 2006, 20 pages.
Madan, Sameer, "Search the Web without A headache," PC World (India), pp. 40-41, Feb. 1998, printed Dec. 20, 1999, 2 pages.
"Terrestrial to Internet Radio's Big Opportunity," Concert Technology, Dec. 1, 2008, 8 pages.
Smith, Patricia, "WebCompass Takes Web Searching in the Right Direction," Seybold Report on Desktop Publishing, vol. 10, No. 10, pp. 1-9, found at <http://www.seyboldseminars.com/seybold_report/reports/D1010001.htm>, copyright 1996, Seybold Publications Inc., 9 pages.

* cited by examiner

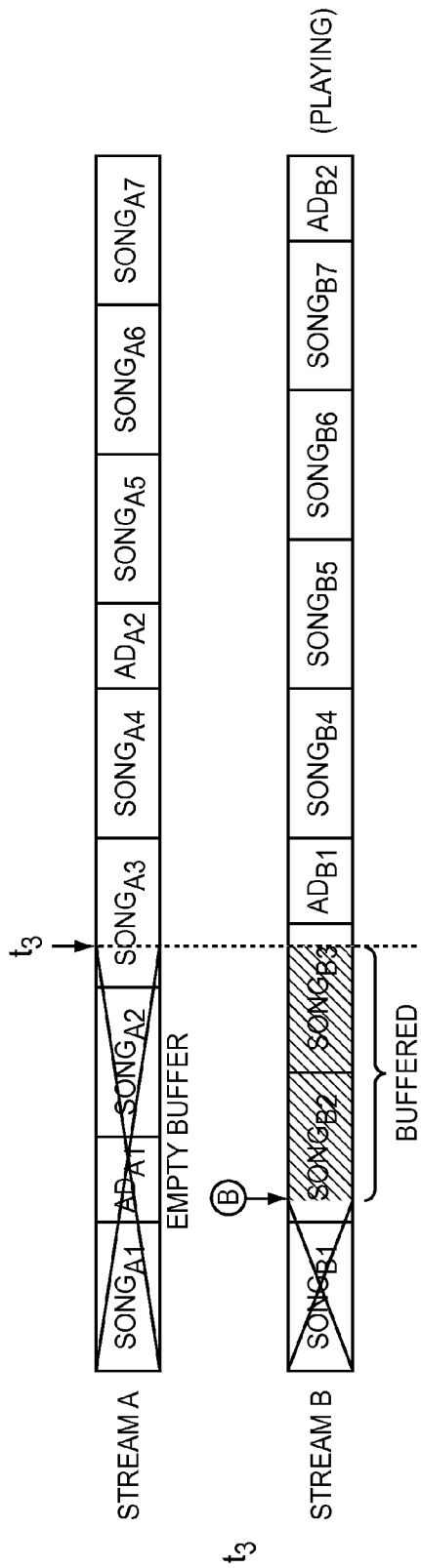
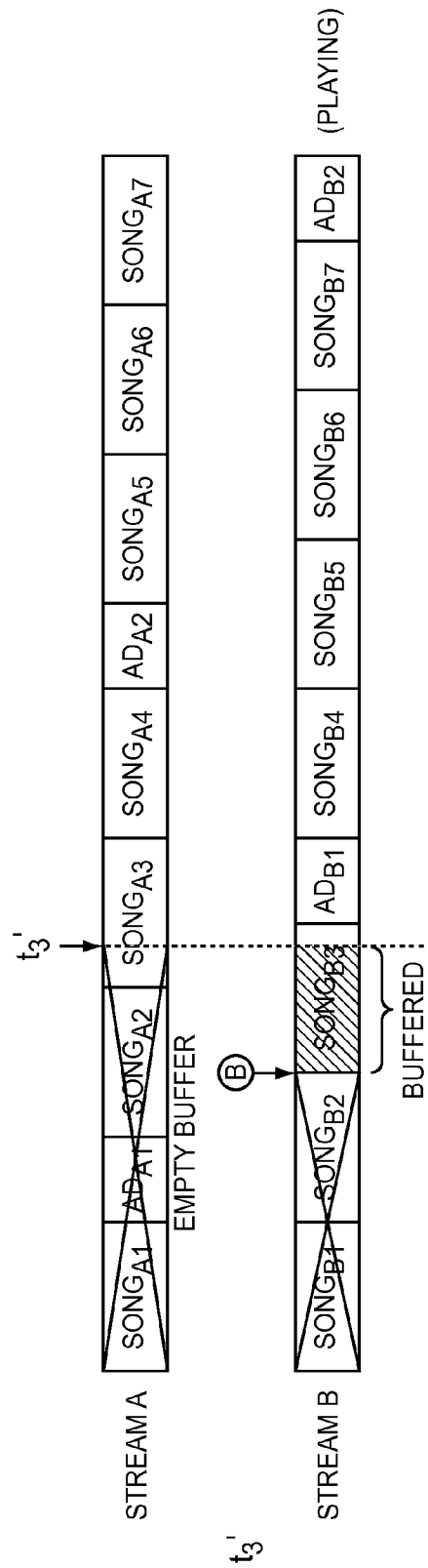

SKIP FEATURE FOR A BROADCAST OR MULTICAST MEDIA STATION

RELATED APPLICATIONS

This application is a continuation of U.S. application Ser. No. 12/768,980, now U.S. Pat. No. 8,463,930, entitled "Skip Feature for a Broadcast or Multicast Media Station," which claims the benefit of provisional patent application Ser. No. 61/173,624, filed Apr. 29, 2009, the disclosure of each of which is hereby incorporated by reference in its entirety.

FIELD OF THE INVENTION

The present invention relates to a skip feature for a broadcast or multicast media station such as a broadcast or multicast radio station.

BACKGROUND

Many Internet radio stations provide a skip feature using a unicast communication channel to each user (i.e., each user is delivered a separate radio stream). As such, each user is enabled to independently skip ahead if they to not want to listen to the current song. Such a skip feature is a key feature in that it gives the users listening choices without changing radio stations and provides a means by which users are interactively engaged with the radio station broadcast. This level of engagement allows the radio station or provider to confirm the presence of the user with respect to advertisement impression reporting or song royalty reporting.

However, the current skip features of Internet radio stations that use separate unicast streams to each individual user are inapplicable to broadcast or multicast media stations where multiple users are delivered the same content stream. As such, there is a need for a skip feature for broadcast or multicast media stations.

SUMMARY

A skip function for a broadcast or multicast media station is disclosed. In one embodiment, two content streams are simultaneously transmitted for a single radio station. A receiving device simultaneously receives the two content streams transmitted for the radio station. The receiving device provides playback of a first content stream of the two content streams. During playback of the first content stream, the receiving device buffers one or more most recently received content items from a second content stream of the two content streams. When a user of the receiving device initiates a skip, the receiving device performs a skip function by switching playback from the first content stream to the second content stream beginning at the start of the one or more most recently received content items from the second content stream that have been buffered at the receiving device.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 2:
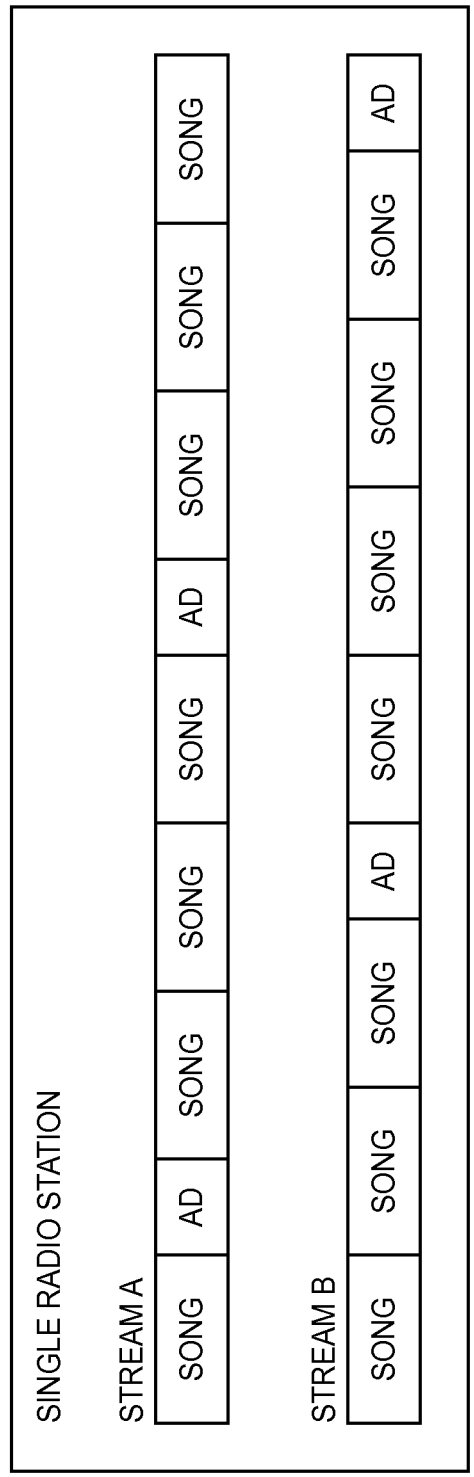
Figure 3:
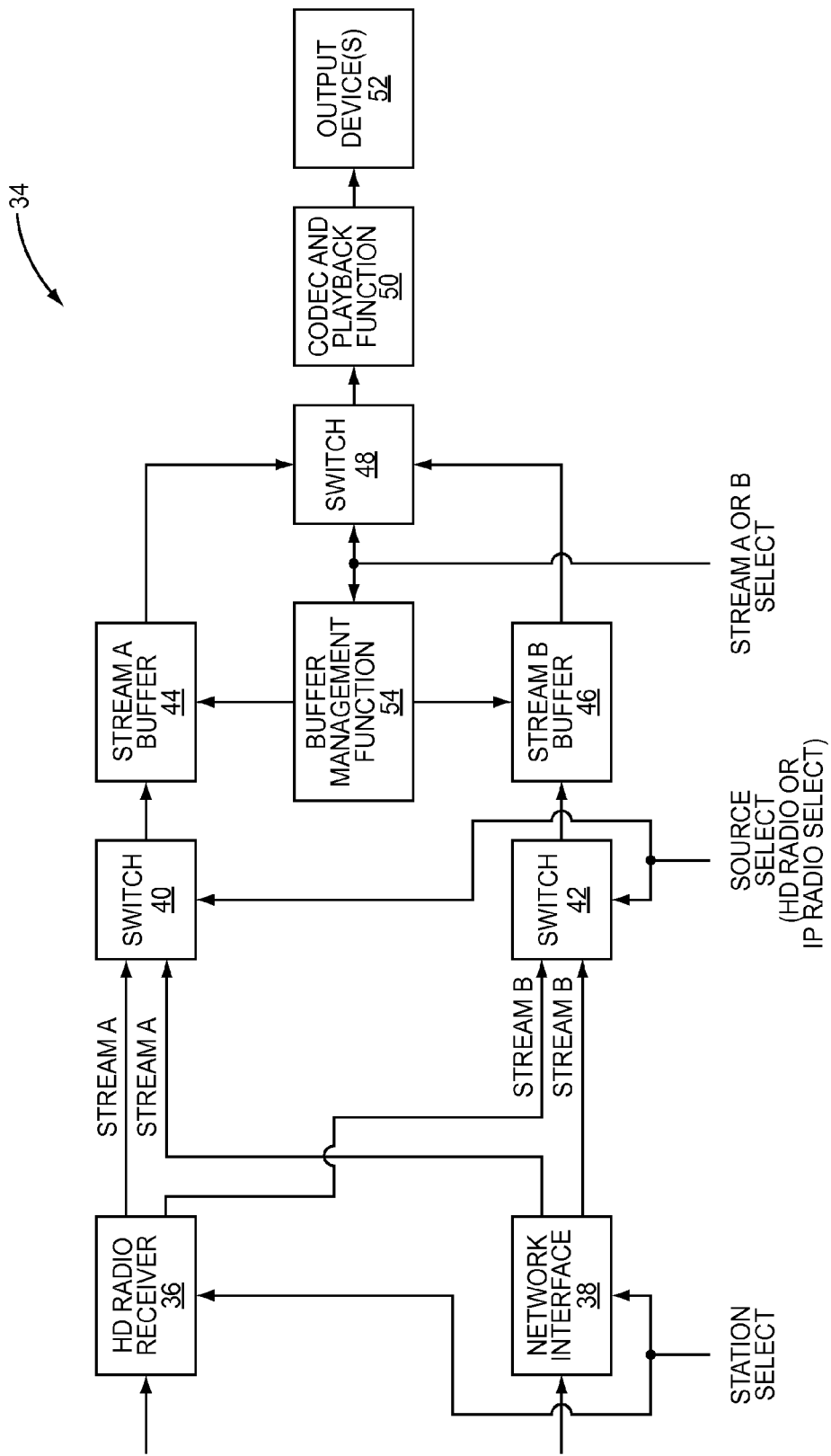

FIG. 1 illustrates a system in which a skip feature is implemented for a broadcast or multicast media station according to one embodiment of this disclosure;

FIG. 2 graphically illustrates two exemplary content streams for a media station enabling a skip feature according to one embodiment of this disclosure;

FIG. 3 is a block diagram of an exemplary embodiment of one of the receiving devices of FIG. 1;

FIGS. 4A-4H graphically illustrate the operation of the receiving device of FIG. 3 to provide a skip feature for a broadcast or multicast media station according to one embodiment of this disclosure; and FIGS. 5A-5I graphically illustrate the operation of the receiving device of FIG. 3 to provide a skip feature for a broadcast or multicast media station according to another embodiment of this disclosure.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 illustrates a system 10 in which a skip feature is implemented for a broadcast or multicast media station according to one embodiment of this disclosure. As used herein, a media station is preferably either a radio station (e.g., WCMC-HD 99.9 FM in Raleigh-Durham, N.C. or the like) or a television station (e.g., NBC, ABC, CBS, FOX, or the like). The system 10 includes a media station server 12 that operates to provide streaming content for a media station to a number of receiving devices 14-1 through 14-$N_1$ having associated users 16-1 through 16-$N_1$ via an Internet Protocol (IP) based infrastructure. In this embodiment, the IP based infrastructure includes a streaming IP server 18 and an IP based network 20. The IP based network 20 is preferably a global network such as the Internet. However, the present invention is not limited thereto.

In addition, the media station server 12 operates to provide the streaming content for the media station to a number of receiving devices 22-1 through 22-$N_2$ having associated users 24-1 through 24-$N_2$ via a terrestrial broadcast infrastructure. In this embodiment, the terrestrial broadcast infrastructure includes broadcasting towers 26 and 28. While two broadcasting towers 26 and 28 are illustrated in this embodiment, the terrestrial broadcast infrastructure may include any number of one or more broadcasting towers. Note that while both the receiving devices 14-1 through 14-$N_1$ and the receiving devices 22-1 through 22-$N_2$ are discussed herein, the media station server 12 may alternatively deliver the streaming content for the media station to only the receiving devices 14-1 through 14-$N_1$ via the IP based infrastructure or only the receiving devices 22-1 through 22-$N_2$ via the terrestrial broadcast infrastructure. Also, while not illustrated, the concepts discussed herein are also applicable to a satellite broadcast network such as, for example, satellite radio (e.g., XM/Sirius satellite radio).

The media station server 12 is a physical server that operates to transmit streaming media content for a media station according to a programming schedule generated by a programming function 30. More specifically, as discussed below, the media station server 12 transmits two different content streams for the media station in order to enable a skip function at the receiving devices 14-1 through 14-$N_1$ and 22-1 through 22-$N_2$. Notably, the two content streams each contain different media content for a single media station. The media station server 12 preferably transmits the two different content streams simultaneously. For example, the two different content streams may be transmitted at substantially the same time via separate sub-carrier frequencies of a single HD radio channel, transmitted at substantially the same time in different time slots of a single Time Division Multiplexing (TDM) channel, or the like. Further, the two different content streams may be transmitted by the media station server 12 using a traditional streaming protocol wherein the two different content streams are streamed in real-time. In another embodiment, the two different content streams may be streamed using progressive downloading. For progressive downloading, chunks of content for each of the two different content streams are progressively downloaded as needed. For example, if a ten second chunk of content can be downloaded in three seconds, then the media station server 12 may progressively download ten second chunks of the content for each of the two different content streams approximately every ten seconds. The remaining capacity of the transmission channel may be used for additional services.

The programming function 30 may be implemented in software, hardware, or a combination thereof. The programming function 30 operates to generate programming schedules for the two content streams. For each of the two content streams for the media station, the programming schedule includes a number of media items, which in this embodiment are from a content database 32. The content database 32 includes a number of media items or references to a number of media items that may be distributed on the media station. The media items may be audio items such as songs, news, and audio advertisements; video items such as television programs, movies, and video advertisements; or the like.

In the preferred embodiment, the programming function 30 operates to generate the programming schedules for the two content streams such that the media station complies with one or more rights management rules relating to the distribution of media content on the media station. The one or more rights management rules may be provided in one or more licenses granted for media content to be distributed on the media station. For instance, in an embodiment where the media station is a radio station, the programming function 30 may generate the programming schedules for the two content streams for the radio station to comply with the Digital Millennium Copyright Act (DMCA) in such a manner as to avoid payment of music-on-demand type fees or charges. Some key rules of the DMCA are summarized as follows:

- a radio station cannot perform sound recordings within one hour of a request by a listener or at a time designated by the listener;
- in any three hour period, a radio station cannot intentionally include more than three songs (and not more than two songs in a row) from the same recording and cannot include more than four songs (and no more than three songs in a row) from the same recording artist or anthology/box set;
- continuous looped programs on a radio station may not be less than three hours long;
- rebroadcasts of programs may be performed at scheduled times as follows:
  - programs of less than one hour: no more than three times in a two-week period; and
  - programs longer than one hour: no more than four times in any two-week period; and
- advance program guides or other means cannot be used to pre-announce when particular sound recordings will be played on a radio station.

When generating the programming schedules for the two content streams to comply with the one or more rights management rules, the programming function 30 may take into account possible skip events that may occur at the receiving devices 14-1 through 14-$N_1$ and 22-1 through 22-$N_2$. In addition or alternatively, the receiving devices 14-1 through 14-$N_1$ and 22-1 through 22-$N_2$ may perform a Digital Rights Management (DRM) function in order to ensure compliance with one or more rights management rules. For example, the receiving devices 14-1 through 14-$N_1$ and 22-1 through 22-$N_2$ may prevent a skip from one media item to another media item if the skip would violate the one or more rights management rules relating to delivery of media content on the media station.

The receiving devices 14-1 through 14-$N_1$ and 22-1 through 22-$N_2$ are generally any type of devices capable of receiving and processing the two content streams for the media station via the IP based infrastructure or the terrestrial broadcast network infrastructure, respectively. For example, each of the receiving devices 14-1 through 14-$N_1$ may be a personal computer, a mobile smart phone having a cellular network connection to the IP based network 20, a portable media player having a local wireless connection (e.g., IEEE 802.11x) to the IP based network 20, a set-top box, or the like. Similarly, each of the receiving devices 22-1 through 22-$N_2$ may be, for example, a HD radio receiver, a mobile phone equipped with an HD receiver, a portable media player equipped with an HD receiver, or the like.

Using the receiving device 14-1 as an example for the receiving devices 14-1 through 14-$N_1$, the receiving device 14-1 generally operates to receive the two content streams simultaneously transmitted by the media station server 12 for the media station via the IP based infrastructure. More specifically, the streaming IP server 18 receives the two content streams for the media station from the media station server 12 and then transmits the two content streams for the media station over the IP based network 20 using a multicast channel. For example, the streaming IP server 18 may multicast the two content streams for the media station using a single Internet Protocol version 6 (IPv6) multicast channel (i.e., transmitted using a single IPv6 multicast IP address). Alternatively, a different multicast channel may be used for each of the two content streams for the media station. The receiving device 14-1 tunes to, or otherwise selects, the multicast channel for the media station and begins playback of one of the two content streams, which is referred to as a first content stream of the two content streams. The one of the two content streams selected as the first content stream for playback may be determined by the receiving device 14-1. For example, in order to allow the skip feature to be available in the shortest amount of time, the receiving device 14-1 may select the one of the two content streams with the greatest amount of time before starting a next media item as the first content stream.

In one embodiment, in addition to starting playback of the first content stream, the receiving device 14-1 begins buffering a most recent media item received on the other content stream, which is referred to as a second content stream or auxiliary content stream. During playback of the first content stream, the receiving device 14-1 continues to receive the second content stream and buffer the most recent media item received on the second content stream. Thus, as new media items are received on the second content stream, the most recent media item buffered by the receiving device 14-1 is updated. Note that the receiving device 14-1 may be enabled to detect the end of one media item and the start of a next media item in a content stream using any known technique. For example, the content streams may include markers or breaks that identify the start of each media item in the content stream. In addition, the markers or breaks may identify the playback lengths of the media items, the file sizes of the media items, or the like. When the user 16-1 initiates a skip, the receiving device 14-1 switches playback from the first content stream to the second content stream and begins playback of the second content stream at the start of the most recent media item received on the second content stream and buffered at the receiving device 14-1. In this manner, the receiving device 14-1 emulates a skip such that, to the user 16-1, it appears as though the user 16-1 has skipped ahead in playback of the media station to the next media item.

In another embodiment, in addition to starting playback of the first content stream, the receiving device 14-1 begins buffering one or more most recent media items received on the other content stream, which is referred to as a second content stream or auxiliary content stream. In this embodiment, rather than limiting buffering to one media item, buffering is limited to two or more media items. This buffering limit may be a predefined number of media items (e.g., at most two songs and one advertisement) or a maximum number of media items that can be stored in the buffer (i.e., a limit resulting from a size of the buffer). During playback of the first content stream, the receiving device 14-1 continues to receive the second content stream and buffer the one or more most recent media items received on the second content stream. Thus, as new media items are received on the second content stream, the one or more most recent media items buffered by the receiving device 14-1 are updated. When the user 16-1 initiates a skip, the receiving device 14-1 switches playback from the first content stream to the second content stream and begins playback of the second content stream at the start of the one or more most recent media items received on the second content stream and buffered at the receiving device 14-1.

Using the receiving device 22-1 as an example for the receiving devices 22-1 through 22-N₂, the receiving device 22-1 generally operates to receive the two content streams simultaneously transmitted by the media station server 12 for the media station via the terrestrial broadcast network. More specifically, the broadcasting towers 26 and 28 receive the two content streams for the media station from the media station server 12 and then broadcast the two content streams for the media station over the air. Preferably, the two content streams are broadcast over a single carrier frequency. For example, for HD radio, the two continent streams for a HD radio station are preferably simultaneously transmitted as sub-channels of a single HD radio frequency channel. More specifically, in one embodiment, for HD radio, a single carrier frequency can deliver 300 kilobits per second (kb/s), and the two content streams may each use 100 kb/s while leaving the additional 100 kb/s for additional audio or data services. The receiving device 22-1 tunes to, or otherwise selects, a broadcast channel for the media station and begins playback of one of the two content streams, which is referred to as a first content stream of the two content streams. The one of the two content streams selected as the first content stream for playback may be determined by the receiving device 22-1. For example, in order to allow the skip feature to be available in the shortest amount of time, the receiving device 22-1 may select the one of the two content streams with the greatest amount of time before starting a next media item as the first content stream.

In one embodiment, in addition to starting playback of the first content stream, the receiving device 22-1 begins buffering a most recent media item received on the other content stream, which is referred to as a second content stream or auxiliary content stream. During playback of the first content stream, the receiving device 22-1 continues to receive the second content stream and buffer the most recent media item received on the second content stream. Thus, as new media items are received on the second content stream, the most recent media item buffered by the receiving device 22-1 is updated. Note that the receiving device 22-1 may be enabled to detect the end of one media item and the start of a next media item in a content stream using any known technique. For example, the content streams may include markers or breaks that identify the start of each media item in the content stream. In addition, the markers or breaks may identify the playback lengths of the media items, the file sizes of the media items, or the like. When the user 24-1 initiates a skip, the receiving device 22-1 switches playback from the first content stream to the second content stream and begins playback of the second content stream at the start of the most recent media item received on the second content stream and buffered at the receiving device 22-1. In this manner, the receiving device 22-1 emulates a skip such that, to the user 24-1, it appears as though the user 24-1 has skipped ahead in playback of the media station to the next media item.

In another embodiment, in addition to starting playback of the first content stream, the receiving device 22-1 begins buffering one or more most recent media items received on the other content stream, which is referred to as a second content stream or auxiliary content stream. In this embodiment, rather than limiting buffering to one media item, buffering is limited to two or more media items. This buffering limit may be a predefined number of media items (e.g., at most two songs and one advertisement) or a maximum number of media items that can be stored in the buffer (i.e., a limit resulting from a size of the buffer). During playback of the first content stream, the receiving device 22-1 continues to receive the second content stream and buffer the one or more most recent media items received on the second content stream. Thus, as new media items are received on the second content stream, the one or more most recent media items buffered by the receiving device 22-1 are updated. When the user 24-1 initiates a skip, the receiving device 22-1 switches playback from the first content stream to the second content stream and begins playback of the second content stream at the start of the one or more most recent media items received on the second content stream and buffered at the receiving device 22-1.

FIG. 2 is a graphical illustration of two content streams (STREAM A and STREAM B) for a single media station, which in this example is a radio station. As illustrated, each of the two content streams includes a sequence of songs and audio advertisements. However, the present invention is not limited thereto. The two content streams are preferably transmitted over a single communication channel, such as a single HD radio carrier frequency or a single IP multicast address.

FIG. 3 is a block diagram of an exemplary receiving device 34 according to one embodiment of this disclosure. In this embodiment, the media station provided by the media station server 12 (FIG. 1) is a radio station, and the receiving device 34 includes an HD radio receiver 36 for receiving content streams for media stations from the broadcasting towers 26 and 28 (FIG. 1) of the terrestrial broadcast network infrastructure. The HD radio receiver 36 is implemented in hardware. In addition, the receiving device 34 includes a network interface 38 for receiving content streams for media stations from the streaming IP server 18 via the IP based network 20 (FIG. 1). The network interface 38 is implemented in hardware and may be a wired or wireless network interface to the IP based network 20. The HD radio receiver 36 and the network interface 38 are controlled by a station select signal in order to tune to, or otherwise select, a desired media station. Preferably, the station select signal is controlled by a user of the receiving device 34 via a user interface of or associated with the receiving device 34.

For this discussion, the HD radio receiver 36 and the network interface 38 are tuned to the media station provided by the media station server 12. The HD radio receiver 36 operates to receive the two content streams (STREAM A and STREAM B) for the media station from the broadcasting towers 26 and 28 and output the content stream STREAM A to switch 40 and the content stream STREAM B to switch 42. In a similar manner, the network interface 38 operates to receive the two content streams (STREAM A and STREAM B) for the media station from the streaming IP server 18 via the IP based network 20 and output the content stream STREAM A to the switch 40 and the content stream STREAM B to the switch 42. The switches 40 and 42 are controlled via a source select signal to configure the receiving device 34 in either an HD radio mode of operation wherein the two content streams STREAM A and STREAM B from the HD radio receiver 36 are output by the switches 40 and 42, respectively, or an IP radio mode of operation wherein the two content streams STREAM A and STREAM B from the network interface 38 are output by the switches 40 and 42, respectively. When in the IP radio mode, the receiving device 34 operates as one of the receiving devices 14-1 through 14-$N_1$ of FIG. 1. When in the HD radio mode, the receiving device 34 operates as one of the receiving devices 22-1 through 22-$N_2$ of FIG. 1.

The content stream STREAM A output by the switch 40 is buffered by a stream A buffer 44. Likewise, the content stream STREAM B output by the switch 42 is buffered by a stream B buffer 46. The stream A and stream B buffers 44 and 46 may be implemented in memory such as, for example, Random Access Memory (RAM). The outputs of the stream A and stream B buffers 44 and 46 are provided to a switch 48. The switch 48 is controlled by a stream A/stream B select signal. In one embodiment, the stream A/stream B select signal is controlled by a user interface of or associated with the receiving device 34 such that the stream A/stream B select signal switches states when the user of the receiving device 34 selects a skip input (e.g., a skip button).

The output of the switch 48, whether the output is the buffered content stream STREAM A from the stream A buffer 44 or the buffered content stream STREAM B from the stream B buffer 46, is processed by a Coding-Decoding (CODEC) and playback function 50 and a resulting output signal is presented, or rendered, to the user of the receiving device 34 via one or more output devices 52. For example, if the media station is a radio station, the one or more output devices 52 may include one or more speakers, and the output signal of the CODEC and playback function 50 is one or more analog signals that drive the one or more speakers. The receiving device 34 also includes a buffer management function 54 which operates to control the stream A and stream B buffers 44 and 46 based on the stream A/stream B select signal to enable a skip function as described below. Note that the buffer management function 54 may also control the rate at which content is clocked out of the buffers 44 and 46. For example, in some situations, the buffer management function 54 may slightly increase or decrease the rate at which content is clocked out of the stream A buffer 44 (or the stream B buffer 46) to slightly increase or decrease the speed of playback of the content stream STREAM A (or the content stream STREAM B).

The components of the receiving device 34 illustrated in FIG. 3 may be implemented in hardware or a combination of hardware and software. For example, in one embodiment, the HD radio receiver 36 and the network interface 38 are implemented in hardware, and the switches 40, 42, and 48, the buffer management function 54, the CODEC and playback function 50, and possibly the buffers 44 and 46 may be implemented in one or more integrated circuits such as one or more Application Specific Integrated Circuits (ASICs), one or more Field Programmable Gate Arrays (FPGAs), or the like. As another example, in another embodiment, the HD radio receiver 36 and the network interface 38 are implemented in hardware, and the switches 40, 42, and 48, the buffer management function 54, the CODEC and playback function 50, and possibly the buffers 44 and 46 may be implemented in software executed by a computing device (e.g., a processor) having associated memory (e.g., RAM). Other variations of how the components of the receiving device 34 may be implemented in hardware or a combination of hardware and software will be apparent to one of ordinary skill in the art upon reading this disclosure and are to be included within the scope of this disclosure.

Figure 4A:
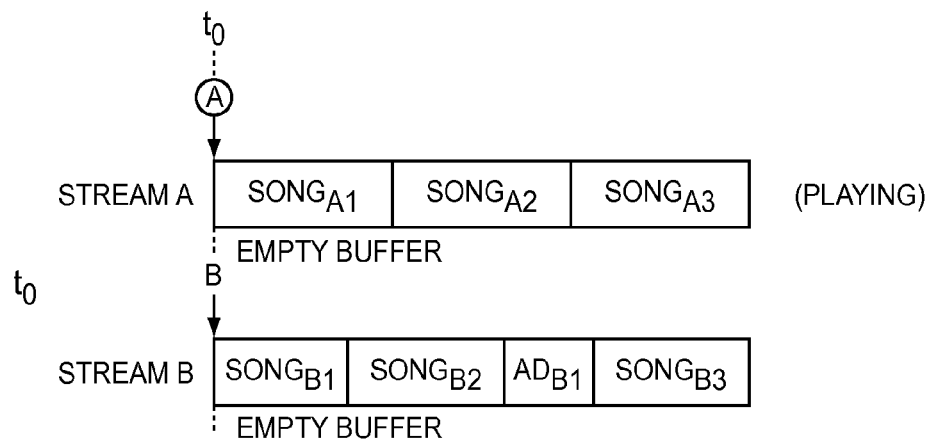

FIGS. 4A through 4H graphically illustrate the operation of the buffer management function 54 and a skip function according to one embodiment of this disclosure. FIG. 4A illustrates a portion of the two streams STREAM A and STREAM B for the media station according to an exemplary embodiment of this disclosure. In this example, upon tuning to the media station, the receiving device 34 may initially buffer an initial amount of both STREAM A and STREAM B in order to provide smooth and continuous playback in a manner similar to that which is done for traditional streaming content. For this discussion, however, this initial buffering is ignored for clarity and ease of discussion. FIG. 4A illustrates a location of the output of the stream A buffer 44 (A) within STREAM A and a location of the output of the stream B buffer 46 (B) within STREAM B upon initially tuning to the media station and starting playback of STREAM A.

Figure 4B:
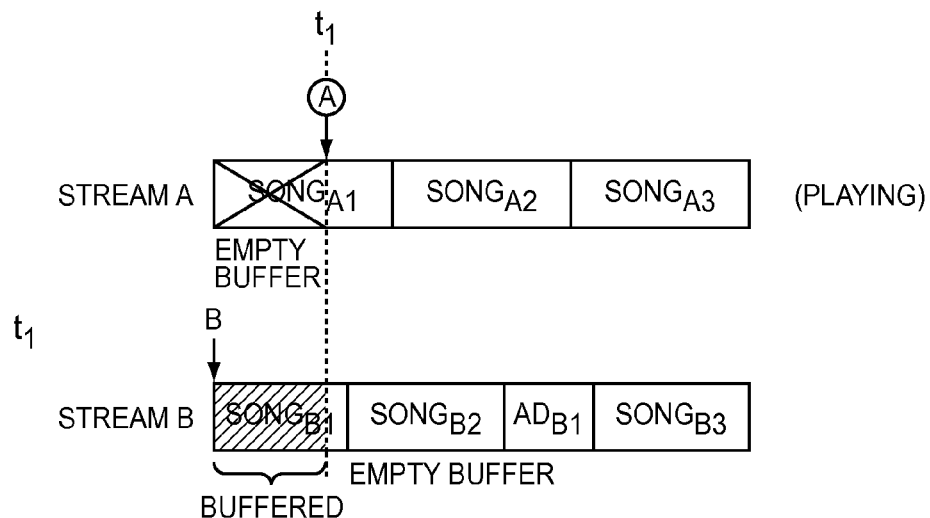

FIG. 4B illustrates the location of the output of the stream A buffer 44 (A) within STREAM A and the location of the output of the stream B buffer 46 (B) within STREAM B after playback of STREAM A from time $t_0$ to time $t_1$. During this time, a portion of $SONG_{A1}$ has been streamed to and played by the receiving device 34. While $SONG_{A1}$ from STREAM A has been playing, a portion of $SONG_{B1}$ is received by the receiving device 14-1 and stored in the stream B buffer 46. Note that the location of the output of the stream B buffer 46 (B) remains at the start of $SONG_{B1}$, which is the most recent song streamed on STREAM B.

Figure 4C:
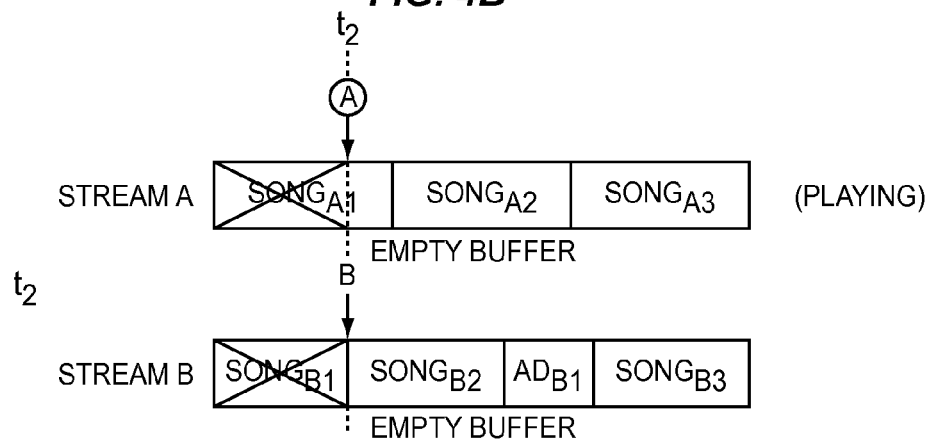

FIG. 4C illustrates the location of the output of the stream A buffer 44 (A) within STREAM A and the location of the output of the stream B buffer 46 (B) within STREAM B after playback of STREAM A continues from time $t_1$ to time $t_2$. At time $t_2$, $SONG_{B1}$ in STREAM B has completed, and $SONG_{B2}$ in STREAM B begins. In this embodiment, only the most recent song played in the auxiliary stream, which at this point is STREAM B, is buffered. As such, the location of the output of the stream B buffer 46 is set to the start of $SONG_{B2}$. Note $SONG_{B1}$, which was previously stored in the stream B buffer 46 has been removed from the stream B buffer 46 in this embodiment. Also, due to the initial buffering of both STREAM A and STREAM B before starting playback, there is preferably a sufficient amount of $SONG_{B2}$ already buffered to enable a smooth transition to playback of $SONG_{B2}$ at time $t_2$ if the user of the receiving device 34 were to initiate a skip.

Figure 4D:
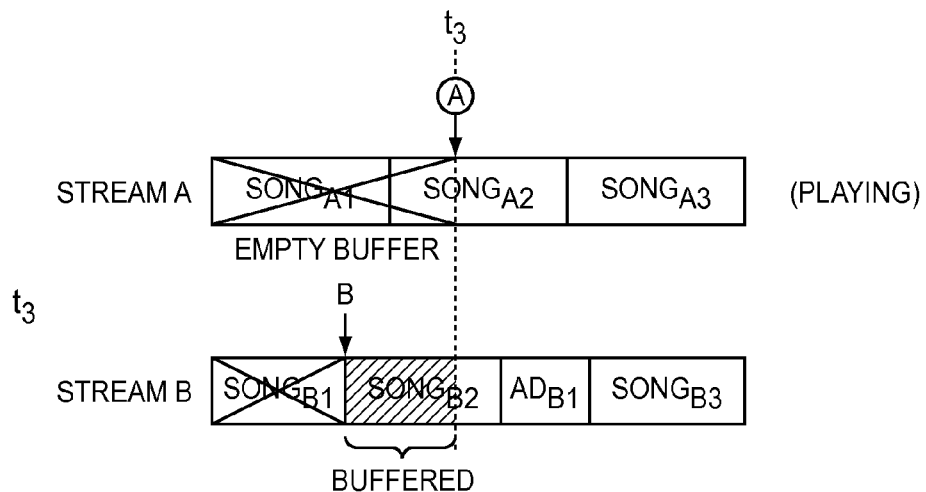

FIG. 4D illustrates the location of the output of the stream A buffer 44 (A) within STREAM A and the location of the output of the stream B buffer 46 (B) within STREAM B at a time $t_3$. During the time from time $t_2$ to time $t_3$, playback of $SONG_{A1}$ has completed and playback of $SONG_{A2}$ in STREAM A has begun. During this time, a portion of $SONG_{B2}$ is received by the receiving device 34 in STREAM B and stored in the stream B buffer 46. Note that the location of the output of the stream B buffer 46 (B) remains at the start of $SONG_{B2}$, which is now the most recent song streamed on STREAM B.

Figure 4E:
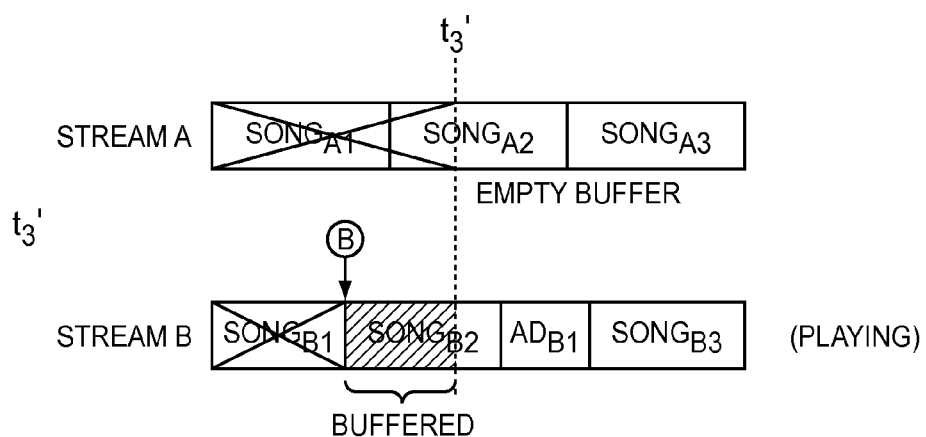

At time $t_3$, the user of the receiving device 34 makes a skip request. In response, the switch 48 (FIG. 3) begins to output the buffered STREAM B from the stream B buffer 46 to begin playback of STREAM B. As illustrated in FIG. 4E, because the location of the output of the stream B buffer 46 (B) has been maintained at the start of the most recent song streamed on STREAM B, which in this example is $SONG_{B2}$, playback of STREAM B begins at the start of $SONG_{B2}$. By switching playback from STREAM A to STREAM B beginning at the start of $SONG_{B2}$, the receiving device 34 emulates a skip request. In other words, playback substantially immediately switches from $SONG_{A2}$ in STREAM A to the start of playback of $SONG_{B2}$ in STREAM B, thereby emulating a skip feature. To the user of the receiving device 34, it appears as though the user has been enabled to skip ahead in the programming of the radio station. In this embodiment, once playback switches to STREAM B, any remaining portion of the song from which the user skipped, which in this example is $SONG_{A2}$, is no longer buffered in the stream A buffer 44. As such, the skip feature is disabled until the start of the next media item (e.g., song or ad) on STREAM A. Note that an indicator may be presented to the user of the receiving device 34 to notify the user when the skip feature is disabled, when the skip feature is enabled, or both.

Figure 4F:
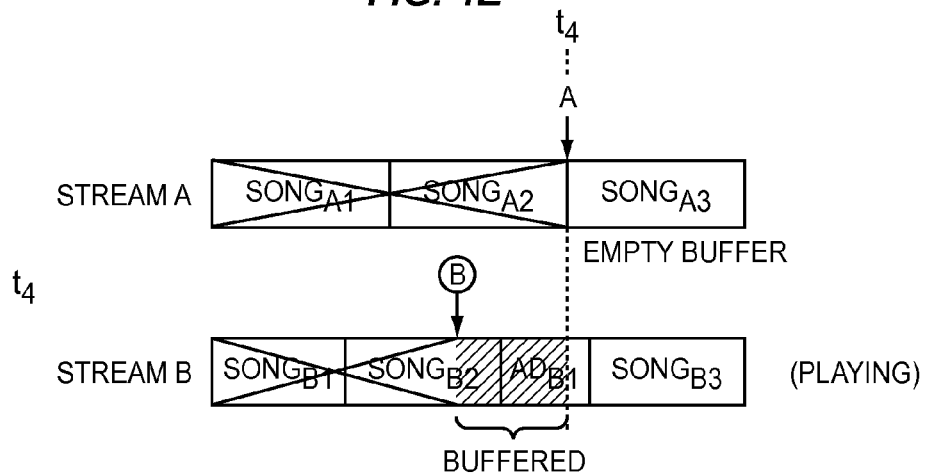
Figure 4G:
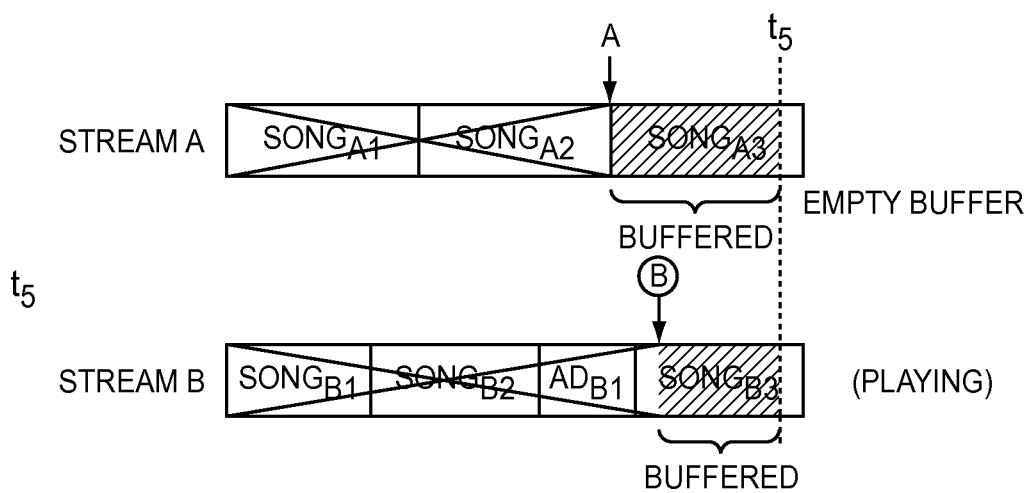
Figure 4H:
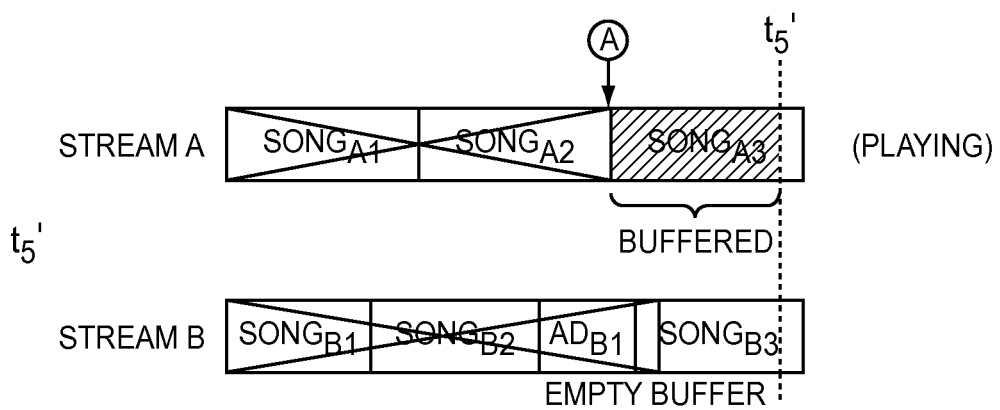

FIG. 4F illustrates the location of the output of the stream A buffer 44 (A) and the location of the output of the stream B buffer 46 (B) at time $t_4$. At time $t_4$, STREAM A has reached the end of $SONG_{A2}$ and the start of the next song, which is $SONG_{A3}$. As such, the location of the output of the stream A buffer 44 (A) is set to the start of $SONG_{A3}$ and the skip feature is again enabled. FIG. 4G illustrates the location of the output of the stream A buffer 44 (A) and the location of the output of the stream B buffer 46 (B) at time $t_5$. At time $t_5$, playback of STREAM B has continued, and the output of the stream A buffer 44 (A) remains at the start of $SONG_{A3}$. At time $t_5$, during playback of $SONG_{B3}$ in STREAM B, the user of the receiving device 34 makes another skip request. In response, as illustrated in FIG. 4H, playback switches from STREAM B to STREAM A beginning at the start of the most recent song on STREAM A, which in this case is $SONG_{A3}$. In this embodiment, the skip feature is now disabled until the start of the next media item (e.g., song or ad) in STREAM B. From this point, playback continues in the manner described above to enable the user of the receiving device 34 to continue playback of the radio station and make skip requests.

FIGS. 5A through 5I graphically illustrate the operation of the buffer management function 54 and a skip function according to another embodiment of this disclosure. In this embodiment, rather than buffering a single most recent media item of the auxiliary stream (i.e., the content stream not currently being played), more than one most recent media item of the auxiliary stream are buffered. Specifically, in this example, at most two most recent media items of the auxiliary stream are buffered.

Figure 5A:
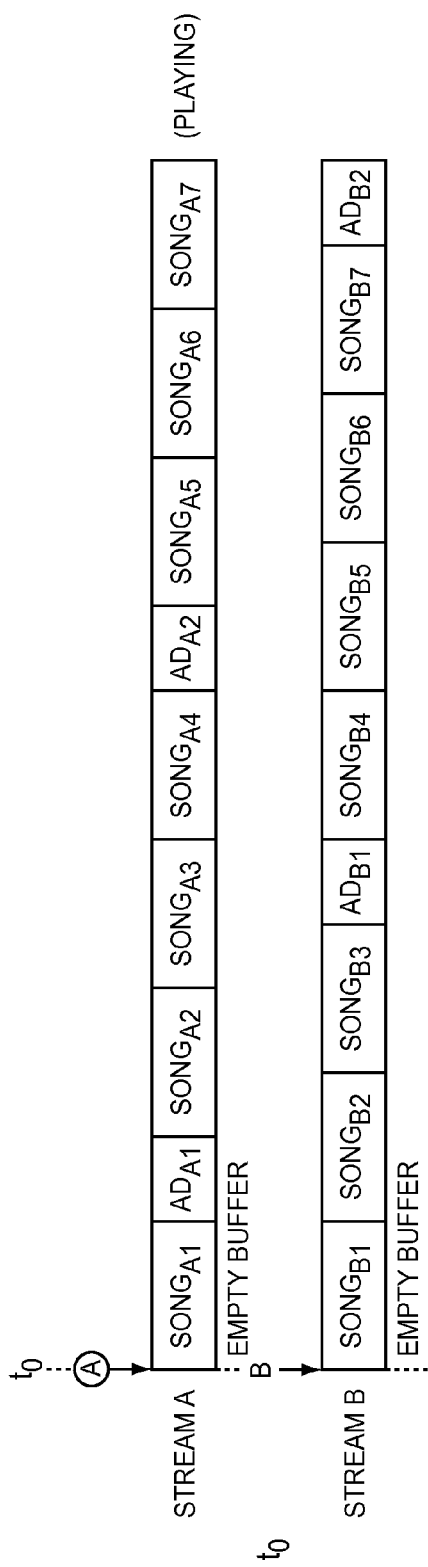

FIG. 5A illustrates a portion of the two streams STREAM A and STREAM B for the media station according to an exemplary embodiment of this disclosure. In this example, upon tuning to the media station, the receiving device 34 may initially buffer an initial amount of both STREAM A and STREAM B. For this discussion, however, this initial buffering is ignored for clarity and ease of discussion. FIG. 5A illustrates a location of the output of the stream A buffer 44 (A) within STREAM A and a location of the output of the stream B buffer 46 (B) within STREAM B upon initially tuning to the media station and starting playback of STREAM A.

Figure 5B:
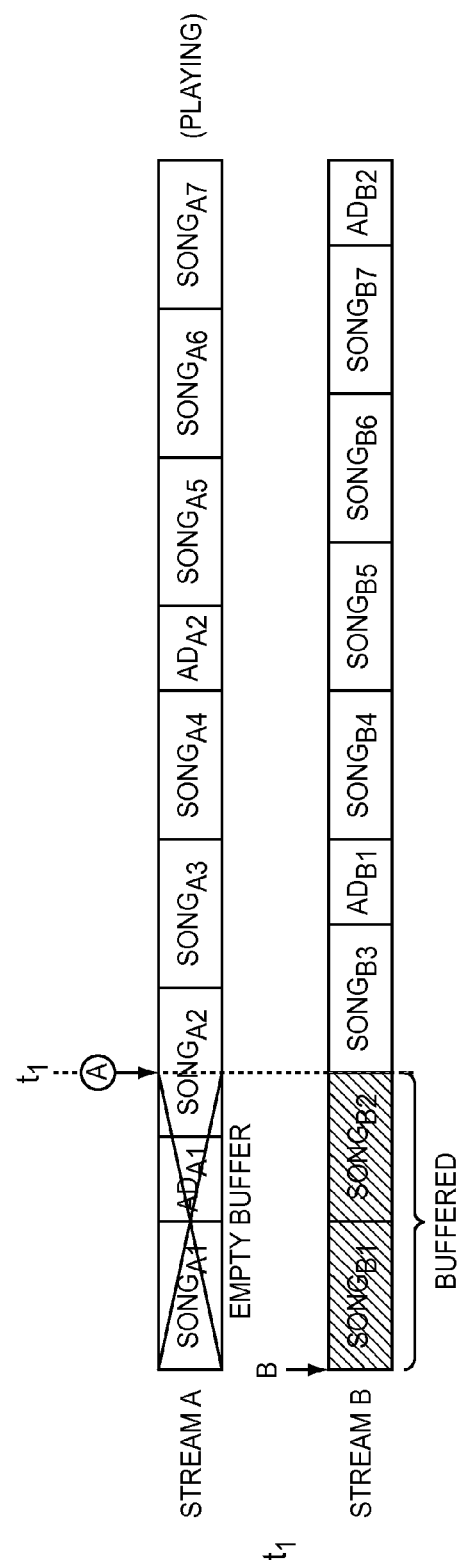

FIG. 5B illustrates the location of the output of the stream A buffer 44

(A) within STREAM A and the location of the output of the stream B buffer 46 (B) within STREAM B after playback of STREAM A from time $t_0$ to time $t_1$. During this time, $SONG_{A1}$, $AD_{A1}$, and a portion of $SONG_{A2}$ have been streamed to and played by the receiving device 34. At the same time, $SONG_{B1}$ and $SONG_{B2}$ in STREAM B have been streamed to the receiving device 34 and stored in the stream B buffer 46. $SONG_{B1}$ and $SONG_{B2}$ are the two most recent songs received in STREAM B and are therefore buffered. Note that the location of the output of the stream B buffer 46 (B) remains at the start of $SONG_{B1}$.

Figure 5C:
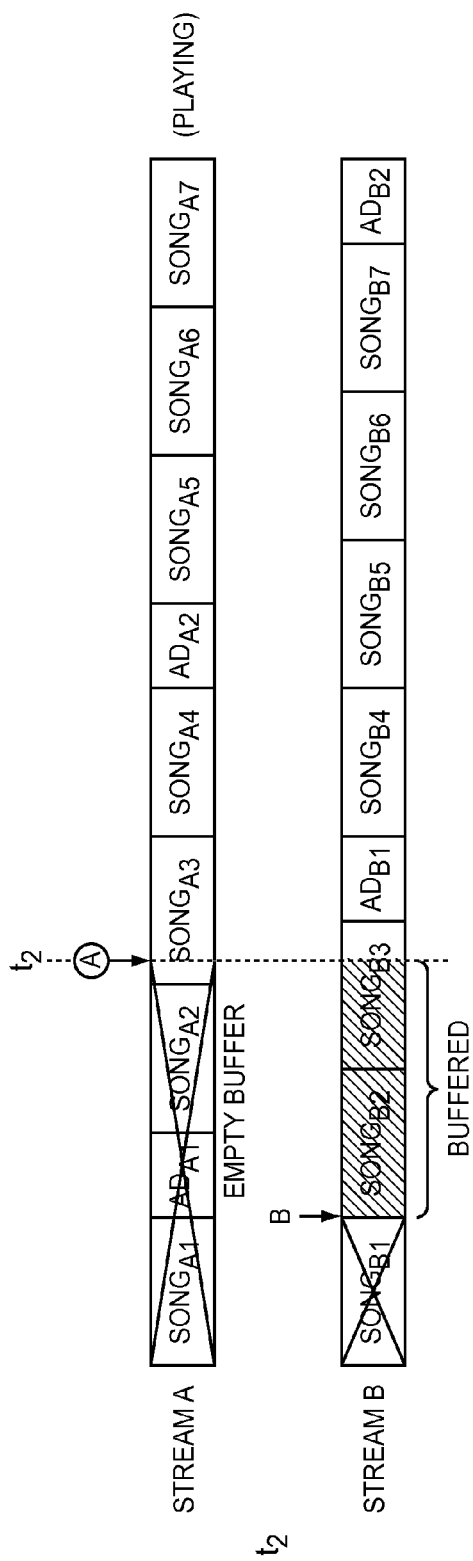

FIG. 5C illustrates the location of the output of the stream A buffer 44 (A) within STREAM A and the location of the output of the stream B buffer 46 (B) within STREAM B after playback of STREAM A from time $t_1$ to time $t_2$. In this embodiment, either the size of the stream B buffer 46 limits buffering to two songs or the buffer management function 54 limits buffering to two songs. As such, once $SONG_{B3}$ begins on STREAM B, $SONG_{B2}$ and $SONG_{B3}$ are the two most recent songs received on STREAM B. As such, the buffer management function 54 sets the location of the output of the stream B buffer 46 (B) to the start of $SONG_{B2}$ such that $SONG_{B2}$ and $SONG_{B3}$ are now the two most recent songs of STREAM B being buffered in the stream B buffer 46. Further, in this embodiment, $SONG_{B1}$ is removed from the stream B buffer 46.

Figure 5D:
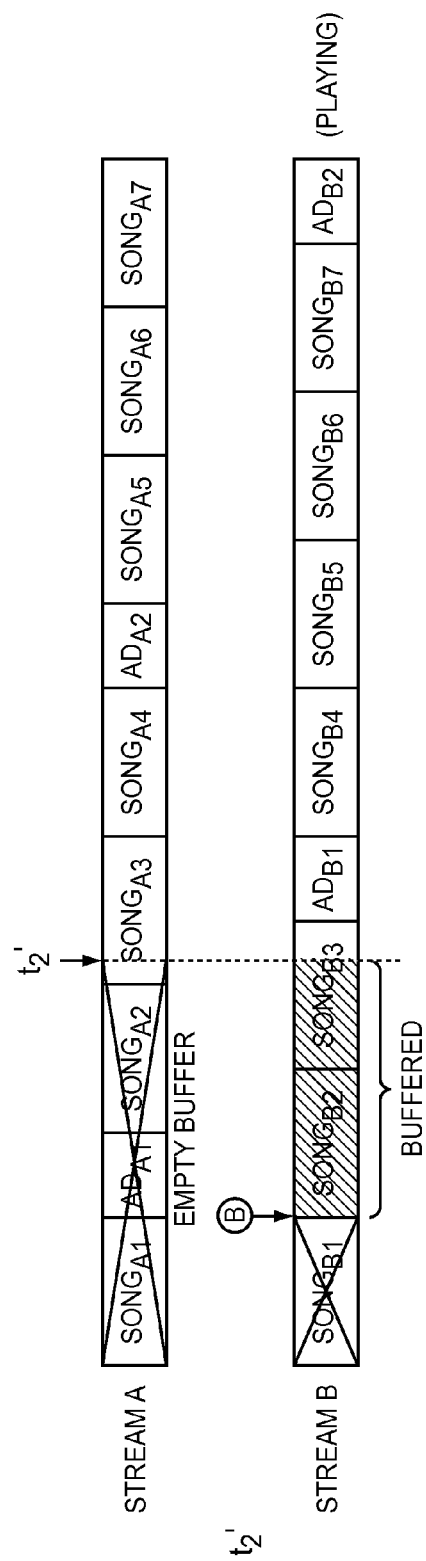

At time $t_2$, the receiving device 34 receives a skip request from the user. In response, as illustrated in FIG. 5D, the receiving device 34 switches playback from STREAM A to STREAM B beginning at the start of the first of the two most recent songs stored in the stream B buffer 46, which in this example is $SONG_{B2}$. As illustrated in FIG. 5E, from time $t_2$ to time $t_3$, playback of $SONG_{B2}$ continues. In this example, after playback of a portion of $SONG_{B2}$, the receiving device 34 receives another skip request from the user. In response, as illustrated in FIG. 5F, since the next song in STREAM B ($SONG_{B3}$) is buffered in the stream B buffer 46, the receiving device 34 skips ahead to $SONG_{B3}$ in STREAM B by setting the location of the output of the stream B buffer 46 (B) to the start of $SONG_{B3}$.

Figure 5G:
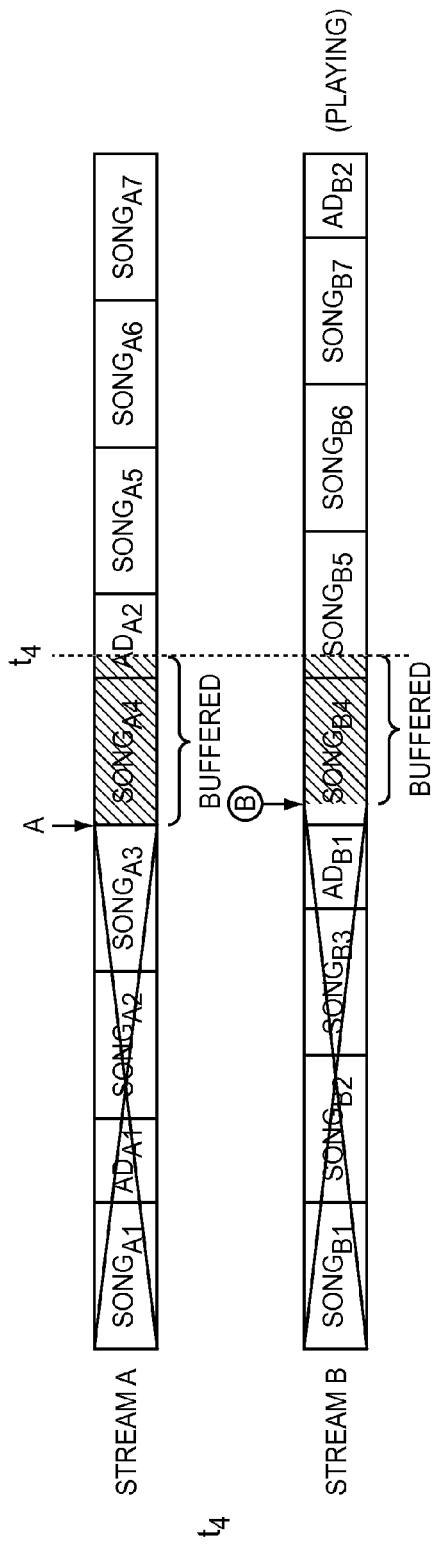
Figure 5H:
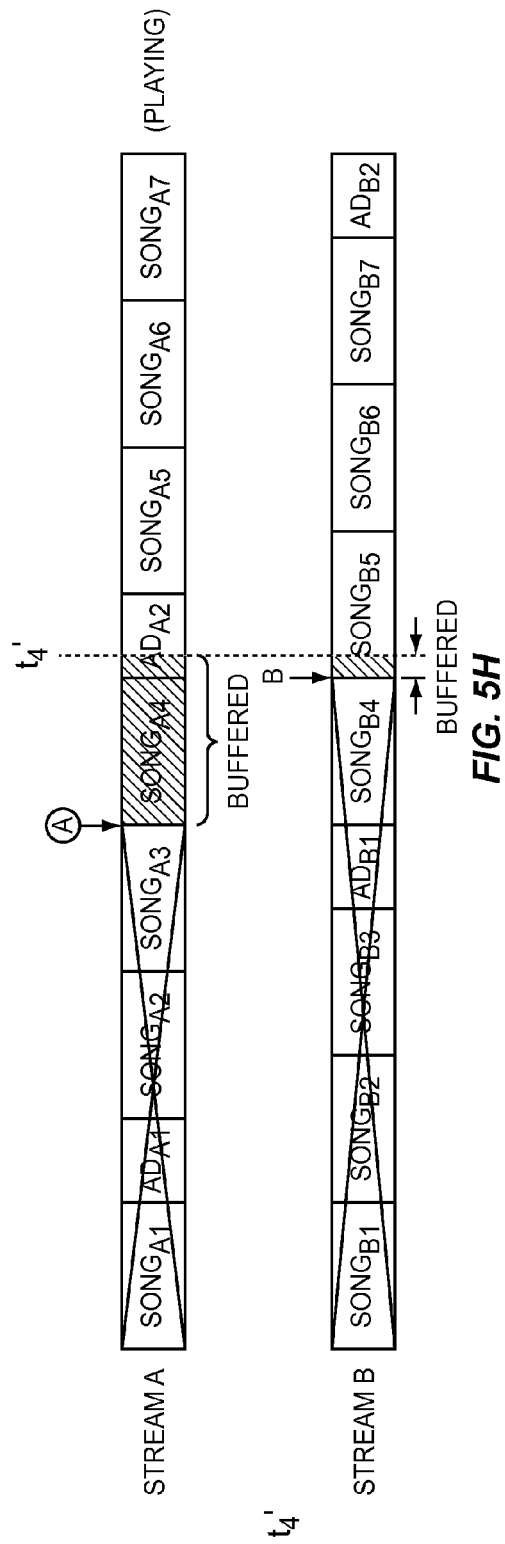
Figure 5I:
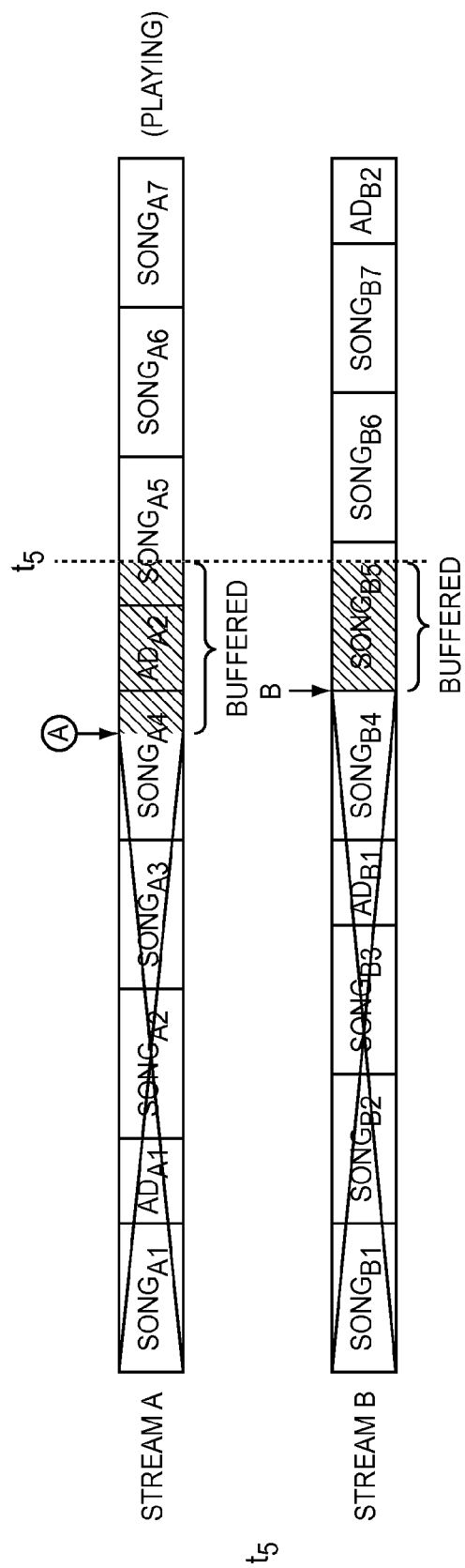

As illustrated in FIG. 5G, playback of STREAM B continues from time $t_3$ to time $t_4$. Note that sometime between time $t_3$ and time $t_4$, the end of $SONG_{A3}$ (i.e., the song from which the user initially skipped ahead) and the beginning of $SONG_{A4}$ occurs. At that point, the location of the output of the stream A buffer 44 (A) is set to the start of $SONG_{A4}$ and buffering of $SONG_{A4}$ begins. At time $t_4$, the receiving device 34 receives another skip request from the user. In response, as illustrated in FIG. 5H, since buffering of the next song in STREAM B has not yet begun, the receiving device 34 switches playback from STREAM B to STREAM A beginning at the start of $SONG_{A4}$. Lastly, FIG. 5I illustrates that buffering of STREAM B again resumes at the start of the next media item in STREAM B, which in this example is $SONG_{B5}$. From this point, playback of the radio station continues in a similar manner.

It should be noted that while the discussion herein focuses on the use of two content streams to provide a skip function for a media station, the present disclosure is not limited thereto. For example, multiple content streams (i.e., more than two content streams) may be used to provide a skip function for a media station. More specifically, multiple content streams are simultaneously transmitted for a single radio station. A receiving device simultaneously receives the multiple content streams transmitted for the radio station. The receiving device provides a skip function by buffering the multiple content streams and systematically switching playback among the multiple content streams in a manner similar to that described above for two content streams.

Those skilled in the art will recognize improvements and modifications to the preferred embodiments of the present invention. All such improvements and modifications are considered within the scope of the concepts disclosed herein and the claims that follow.

What is claimed is:

1. A method of operation of a receiving device comprising:
   receiving two content streams transmitted for a media station;
   providing playback of a first content stream of the two content streams;
   during playback of the first content stream, in response to receiving each most recent media item in a second content stream of the two content streams, discarding all media items previously received in the second content stream and buffering the each most recent media item received in the second content stream; and
   in response to a skip request, switching playback from the first content stream to the second content stream to provide playback of the second content stream beginning at a start of the most recent media item received in the second content stream that is buffered by the receiving device.

2. The method of claim 1 further comprising:
   buffering one or more most recent media items received in the first content stream during playback of the second content stream;
   receiving a subsequent skip request during playback of the second content stream;
   in response to the subsequent skip request, switching playback from the second content stream to the first content stream to provide playback of the first content stream beginning at a start of the one or more most recent media items received in the first content stream that are buffered by the receiving device; and
   continuing playback of the first content stream at least until a subsequent skip request is received during playback of the first content stream.

3. The method of claim 1 comprising continuing playback of the second content stream for a duration in which multiple content items are played in the second content stream before receiving a subsequent skip request during playback of the second content stream.

4. The method of claim 1 wherein buffering the one or more most recent media items received in the second content stream comprises updating the one or more most recent media items buffered by the receiving device as new media items are received in the second content stream.

5. The method of claim 1 wherein the one or more most recent media items are a single most recent media item received in the second content stream.

6. The method of claim 5 wherein buffering the most recent media item received in the second content stream during playback of the first content stream comprises buffering the second content stream in a buffer such that an output of the buffer is set to a start of the single most recent media item received in the second content stream.

7. The method of claim 1 wherein the one or more most recent media items are at most a number N most recent media items received in the second content stream, wherein the number N is greater than 1.

8. The method of claim 7 wherein buffering the one or more most recent media items received in the second content stream comprises buffering the second content stream in a buffer such that an output of the buffer is set to a start of the one or more most recent media items received in the second content stream.

9. The method of claim 7 further comprising:
   receiving a subsequent skip request during playback of one of at least two most recent media items received in the second content stream and buffered at the receiving device; and
   in response to receiving the subsequent skip request, skipping ahead in playback of the second content stream from the one of the at least two most recent media items to a next one of the at least two most recent media items received in the second content stream and buffered at the receiving device.

10. The method of claim 1 wherein the media station is a broadcast media station delivered to a plurality of receiving devices including the receiving device.

11. The method of claim 10 wherein the first and second content streams for the broadcast media station are transmitted over a single HD radio carrier frequency.

12. The method of claim 1 wherein the media station is a multicast media station delivered to a plurality of receiving devices including the receiving device.

13. The method of claim 12 wherein the multicast media station is transmitted using a single Internet Protocol (IP) multicast address.

14. The method of claim 1 further comprising enforcing one or more rights management rules at the receiving device to prevent a skip if the skip would violate the one or more rights management rules.

15. The method of claim 1 wherein content is scheduled on the first and second content streams such that one or more rights management rules are not violated at the receiving device taking into consideration potential skip requests.

16. The method of claim 1 further comprising, upon initially selecting the media station for playback, identifying one of the two content streams as the first content stream for which to provide playback such that an amount of time until a skip feature is available is minimized.

17. A receiving device comprising:
   receiver circuitry adapted to receive two content streams transmitted for a media station;
   a first buffer adapted to buffer a first content stream of the two content streams from the receiver circuitry;
   a second buffer adapted to buffer a second content stream of the two content streams from the receiver circuitry;
   switching circuitry adapted to output a first buffered content stream from the first buffer when configured in a first state and output a second buffered content stream from the second buffer when configured in a second state;
playback circuitry adapted to provide playback of the first or second buffered content stream output by the switching circuitry; and
buffer management circuitry adapted to:
control the first buffer to output the first buffered content stream while the switching circuitry is configured in the first state to provide playback of the first content stream;
control the second buffer such that an output of the second buffer is set to a start of one or more most recent media items received in the second content stream buffered in the second buffer, wherein during playback of the first content stream, in response to receiving each most recent media item in the second content stream, all media items previously received in the second content stream are discarded and each most recent media item received in the second content stream is buffered; and
in response to a skip request from a user of the receiving device, control the second buffer to output the second buffered content stream while the switching circuitry is configured in the second state to provide playback of the second content stream beginning at the start of the one or more most recent media items received in the second content stream buffered in the second buffer.

18. The receiving device of claim 17 wherein, upon initially selecting the media station for playback, the receiving device is further adapted to identify one of the two content streams as the first content stream for which to provide playback such that an amount of time until a skip feature is available is minimized.

19. The receiving device of claim 17 wherein:
the first buffer is further adapted to buffer one or more most recent media items received in the first content stream during playback of the second content stream;
in response to the switching circuitry receiving a subsequent skip request during playback of the second content stream, the buffer management circuitry is further adapted to control the first buffer to output the first buffered content stream while the switching circuitry is configured in the first state to provide playback of the first content stream beginning at a start of the one or more most recent media items received in the first content stream buffered in the first buffer; and
the playback circuitry is further adapted to continue playback of the first content stream at least until a subsequent skip request is received during playback of the first content stream.

20. The receiving device of claim 17 wherein the playback circuitry is further adapted to continue playback of the second content stream for a duration in which multiple content items are played in the second content stream before the switching circuitry receives a subsequent skip request during playback of the second content stream.

21. The receiving device of claim 17 wherein the receiving circuitry updates the one or more most recent media items buffered by the second buffer as new media items are received in the second content stream by the receiving circuitry.

22. The receiving device of claim 17 wherein the one or more most recent media items are a single most recent media item received in the second content stream.

23. The receiving device of claim 22 wherein buffering the most recent media item received in the second content stream during playback of the first content stream comprises buffering the second content stream in the second buffer such that an output of the second buffer is set to a start of the single most recent media item received in the second content stream.

24. The receiving device of claim 17 wherein the one or more most recent media items are at most a number N most recent media items received in the second content stream, wherein the number N is greater than 1.

25. The receiving device of claim 24 wherein buffering the one or more most recent media items received in the second content stream comprises buffering the second content stream in the second buffer such that an output of the second buffer is set to a start of the one or more most recent media items received in the second content stream.

26. The receiving device of claim 24 further comprising:
receiving, by the switching circuitry, a subsequent skip request during playback of one of at least two most recent media items received in the second content stream and buffered at the receiving device; and
in response to the subsequent skip request being received, the buffer management circuitry is further adapted to control the second buffer to skip ahead in the output of the second content stream from the one of the at least two most recent media items to a next one of the at least two most recent media items received in the second content stream.

27. The receiving device of claim 17 wherein the first and second content streams for the media station are transmitted over a single HD radio carrier frequency.

28. The receiving device of claim 17 wherein the receiving device is further adapted to enforce one or more rights management rules at the switching circuitry to prevent a skip if the skip would violate the one or more rights management rules.

29. A non-transitory computer readable medium storing software for instructing a computing device to:
provide playback of a first content stream for a media station, wherein the first content stream for the media station is transmitted with a second content stream for the media station;
during playback of the first content stream, in response to receiving each most recent media item in a second content stream of the two content streams, discard all media items previously received in the second content stream and buffer the each most recent media item received in the second content stream;
in response to a skip request, switch playback from the first content stream to the second content stream to provide playback of the second content stream beginning at a start of the one or more most recent media items received in the second content stream that are buffered at the computing device.

30. The non-transitory computer readable medium of claim 29 wherein the software for instructing a computing device further comprises instructions to:
buffer one or more most recent media items received in the first content stream during playback of the second content stream;
receive a subsequent skip request during playback of the second content stream;
in response to the subsequent skip request, switch playback from the second content stream to the first content stream to provide playback of the first content stream beginning at a start of the one or more most recent media items received in the first content stream that are buffered by the receiving device; and continue playback of the first content stream at least until a subsequent skip request is received during playback of the first content stream.

31. The non-transitory computer readable medium of claim 29 wherein the software for instructing a computing device further comprises instructions to continue playback of the second content stream for a duration in which multiple content items are played in the second content stream before receiving a subsequent skip request during playback of the second content stream.

32. The non-transitory computer readable medium of claim 29 wherein to buffer the one or more most recent media items received in the second content stream, the software for instructing the computing device further comprises instructions to update the one or more most recent media items buffered by the receiving device as new media items are received in the second content stream.

33. The non-transitory computer readable medium of claim 29 wherein the one or more most recent media items are a single most recent media item received in the second content stream.

34. The non-transitory computer readable medium of claim 33 wherein to buffer the most recent media item received in the second content stream during playback of the first content stream, the software for instructing a computing device further comprises instructions to buffer the second content stream in a buffer such that an output of the buffer is set to a start of the single most recent media item received in the second content stream.

35. The non-transitory computer readable medium of claim 29 wherein the one or more most recent media items are at most a number N most recent media items received in the second content stream, wherein the number N is greater than 1.

36. The non-transitory computer readable medium of claim 35 wherein to buffer the one or more most recent media items received in the second content stream the software for instructing a computing device further comprises instructions to buffer the second content stream in a buffer such that an output of the buffer is set to a start of the one or more most recent media items received in the second content stream.

37. The non-transitory computer readable medium of claim 35 wherein the software for instructing a computing device further comprises instructions to:
  receive a subsequent skip request during playback of one of at least two most recent media items received in the second content stream and buffered at the receiving device; and
  in response to receiving the subsequent skip request, skip ahead in playback of the second content stream from the one of the at least two most recent media items to a next one of the at least two most recent media items received in the second content stream and buffered at the receiving device.

38. The non-transitory computer readable medium of claim 29 wherein the first and second content streams for the media station are transmitted over a single HD radio carrier frequency.

39. The non-transitory computer readable medium of claim 29 wherein the software for instructing a computing device further comprises instructions to enforce one or more rights management rules to prevent a skip if the skip would violate the one or more rights management rules.

40. The non-transitory computer readable medium of claim 29 wherein the software for instructing a computing device further comprises instructions to upon initially selecting the media station for playback, identify one of the two content streams as the first content stream for which to provide playback such that an amount of time until a skip feature is available is minimized.

* * * * *